United States Patent [19]

Scarrow

[11] Patent Number: 5,121,996
[45] Date of Patent: Jun. 16, 1992

[54] FLUID CONTAINERS AND PORTS THEREFOR

[75] Inventor: David Scarrow, Bath, England

[73] Assignee: DRG Flexpak Limited, Bristol, England

[21] Appl. No.: 476,456

[22] PCT Filed: Nov. 4, 1988

[86] PCT No.: PCT/GB88/00947
§ 371 Date: Jun. 6, 1990
§ 102(e) Date: Jun. 6, 1990

[87] PCT Pub. No.: WO89/04280
PCT Pub. Date: May 18, 1989

[30] Foreign Application Priority Data

Nov. 4, 1987 [GB] United Kingdom ............... 8725833

[51] Int. Cl.⁵ ............................................. B65D 30/24
[52] U.S. Cl. .................................... 383/44; 383/93; 383/904; 493/199; 493/210; 604/415
[58] Field of Search ................ 383/93, 94, 904, 906, 383/44, 57, 87, 122; 604/262, 411, 415; 493/214, 210, 199, 189; 206/603

[56] References Cited

U.S. PATENT DOCUMENTS

| | | | |
|---|---|---|---|
| 2,378,503 | 6/1945 | Rohdin | 383/904 |
| 2,682,902 | 7/1954 | Metzger | 383/44 |
| 3,017,070 | 1/1962 | London | 383/87 |
| 3,279,330 | 10/1966 | Harding | 493/214 |
| 3,337,117 | 8/1967 | Lehmacher et al. | 383/44 |
| 3,384,294 | 5/1968 | Astle | 383/44 |
| 3,474,789 | 10/1969 | Soto | 604/415 |
| 3,839,128 | 10/1974 | Arai493 | 214/ |
| 4,768,818 | 9/1988 | Kolic | 383/122 |

FOREIGN PATENT DOCUMENTS 359659 2/1962 Switzerland ............... 383/44

Primary Examiner—Stephen P. Garbe
Attorney, Agent, or Firm—Larson & Taylor

[57] ABSTRACT

A container has a body made of superimposed layers of flexible plastics film and a port sealed between said layers. The port comprises superimposed layers of flexible plastics material which provide a channel. A layer of non-sealable material is located in said channel during sealing of the port to the container body so as to prevent the opposing surfaces of the channel from being sealed together, said non-sealable layer being thereafter removed. Preferably the port comprises two layers of film united at one end thereof and along opposite sides thereof to provide the channel with a rupturable closure at the one end.

11 Claims, 2 Drawing Sheets

FLUID CONTAINERS AND PORTS THEREFOR

The present invention relates to ports for incorporation in flexible fluid containers, and processes for their manufacture. It is particularly applicable to ports and containers which are used in the medical field.

For some time now, sterile fluids for medical administration have been packaged in flexible containers. The ports used for filling the containers, addition of drugs, administration, etc., have been circular in cross-section. This form of construction imposes limitations on the types of materials and the methods of manufacture that may be utilised.

According to one aspect of the present invention there is provided a method of making a container comprising a body made of superimposed body layers of flexible plastics film and a port sealed between said body layers, said port comprising superimposed port layers of flexible plastics film material which are sealed along opposite sides so as to form a central channel and wherein a layer of non-sealable material is located in said channel during sealing of the port to the container body, so as to prevent the opposing surfaces of the channel, from being sealed together, said non-sealable layer being thereafter removed; characterised in that the port is formed from one or more webs of material arranged so as to provide a pair of outer port layers and a pair of inner port layers, wherein said inner port layers, are united together at one end thereof and united to respective outer port layers at the other end thereof; and in that the layers of the container body are sealed to the adjacent outer layers of the port.

It is also preferred that the inner layers of the port should be sealed to the outer layers so as to provide reinforced walls for the port.

According to another aspect of the invention there is provided a container comprising a body made from superimposed layers of flexible plastics film material and a port sealed between said layers, characterised in that the port comprises a pair of outer layers and a pair of inner layers wherein said inner layers are united together at one end thereof and united to respective outer layers at the other end thereof, the inner layers being sealed together along opposite sides, so as to define a channel open at one end, the port being sealed between the layers of the container body by a seal transversely of the port in a region occupied by the channel, the outer layers of the port being sealed to adjacent layers of the container body and to adjacent inner layers of the port without the inner layers being sealed to each other by said transverse seal.

Preferably the two inner layers of the port are formed from a single web of material which has been folded back on itself so that the layers are united at said one end by a fold in the material.

Preferably, the union of one of the inner layers and its respective outer layer is offset longitudinally of said channel with respect to the union of the other inner layer and its respective outer layer, so as to form a lip at the entrance of the channel.

Preferably the region of the port between the seal of the outer layers with the container body and the union of the ends of outer layers with the respective inner layers comprises a continuous seal between the outer layers and the respective inner layers so as to form reinforced walls for the port.

The invention also includes ports for use in making containers hereof, and methods of making such ports.

In order that the present invention may be better understood, various embodiments are described, by way of example only, with reference to the accompanying drawings, wherein.

Figure 1:
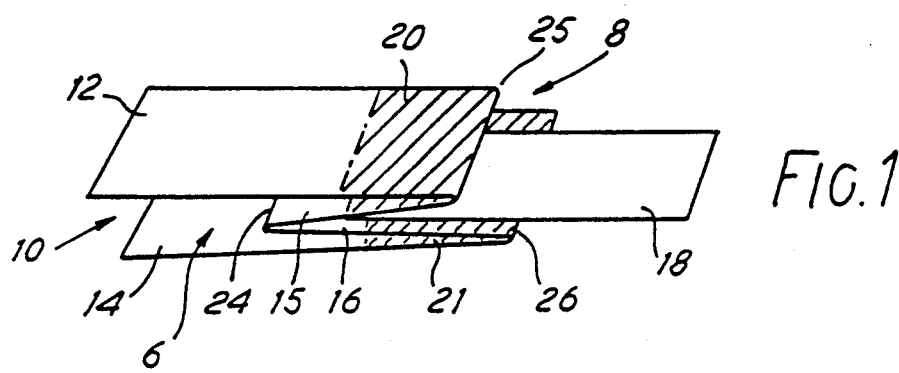
FIG. 1 shows a perspective view of the port before sealing.
Figure 2:
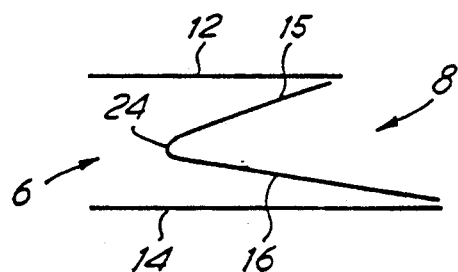
FIG. 2 shows a side view of an alternative construction of the port before sealing.

The port 10 may be constructed from a single piece of material, as shown in FIG. 1, folded into an M shaped configuration, with inner layers 15,16 and outer layers 12,14. The outer layers 12,14 are united to the inner layers 15,16 at folds 25,26 respectively. Inner layers 15,16 are united together at a fold 24. Alternatively, the outer layers 12,14 and the inner layers 15,16 may be three separate pieces of material as shown in FIG. 2, with the inner layers 15,16 formed from a folded web of material. The inner layers 15,16 divide the port into two regions, an outer channel region 8 and an inner channel region 6, by virtue of fold 24.

A strip of non-sealable material 18, such as PTFE tape, is placed within the outer channel region 8. Seals 20,21, between layers 12,15 and 14,16, respectively, can now be formed in the outer region 8 without the opposing surfaces of the inner layers 15,16 being sealed together in the region occupied by the strip 18.

Figure 3:
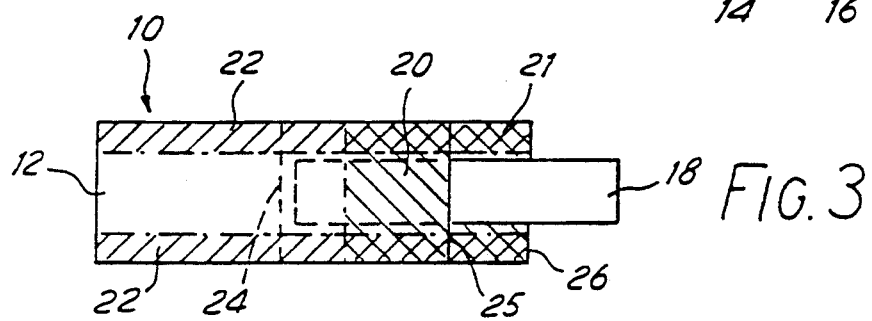
FIG. 3 shows a plan view of a completed port.

The sides of the layers are now closed by seals 22 along the full length of the port to define the channel as shown in FIG. 3.

Figure 4:
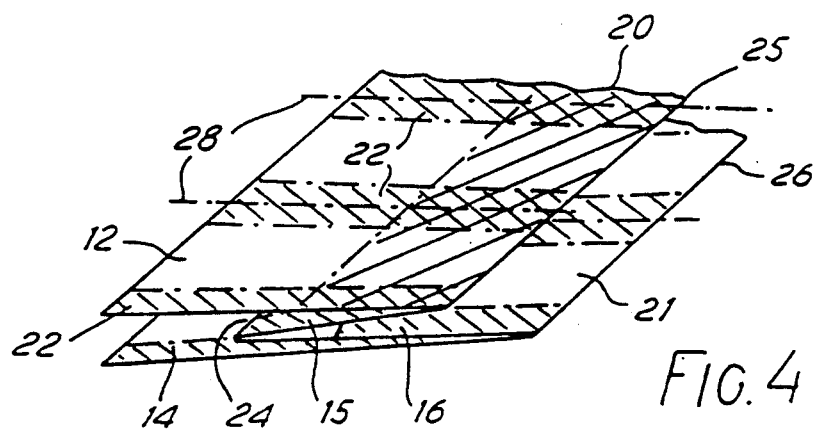
FIG. 4 shows a perspective view of a modified method of making the port.

Alternatively, a plurality of ports may be manufactured in a long strip as shown in FIG. 4, and when all seals 20,21,22 have been made, the ports may be separated along the lines 28.

Figure 5:
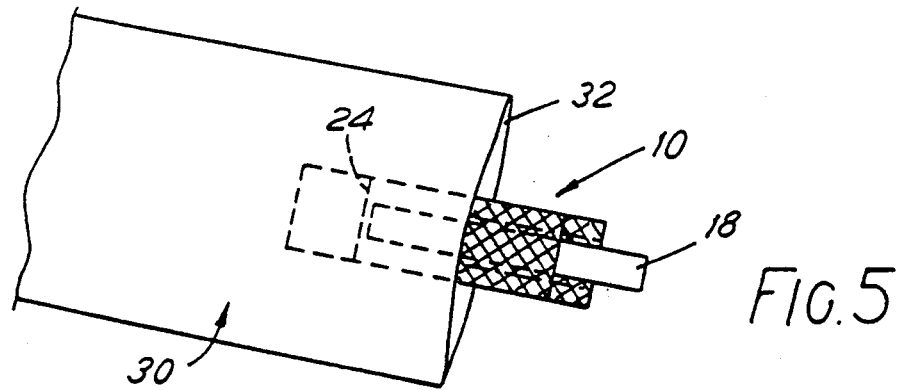
FIG. 5 shows a plan view of the assembly of the port and container body.

The port 10 is then placed in the mouth 32 of a flexible container 30, as shown in FIG. 5. A strip of non-sealable material 18 such as PTFE is located in the outer channel region 8. The mouth of the flexible container is then closed by a transverse seal 38 as shown in FIG. 6, which traverses the outer channel region 8.

Figure 6:
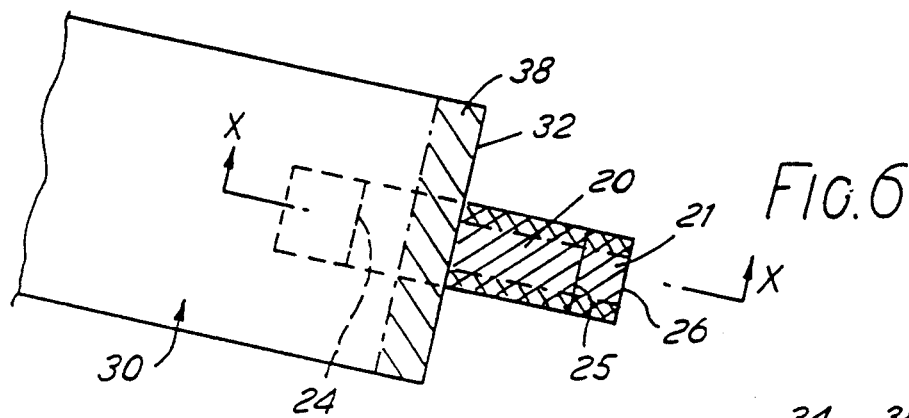
FIG. 6 shows a plan view of the port sealed to the container body.
Figure 8:
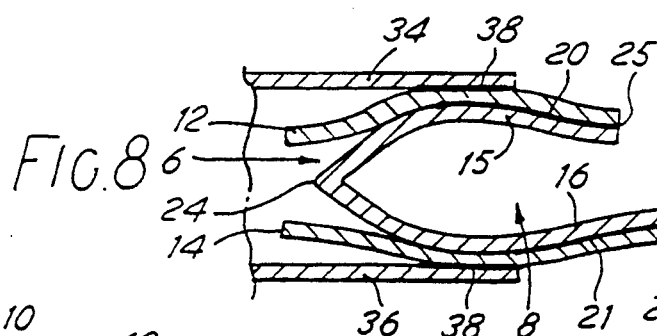
FIG. 8 shows an enlarged cross-sectional view of the port sealed to the container body.

FIG. 8 shows a cross-section of FIG. 6 along line X—X. The two sides of the flexible container 34,36 are sealed at 38 to the outer layers 12,14 respectively, of the port. Seals 20,21 preferably extend to the seals 38 so as to form reinforced walls to the port which will guide a needle or the like, through the outer channel region, piercing the fold 24 between the inner and outer channel regions 6,8 and into the container body, and will not pass through the side walls.

As shown in the drawings, the folds or joins 25,26 between the inner and outer layers are preferably offset so as to form a lip at the opening of the channel which facilitates the entry of the needle or the like.

Figure 7:
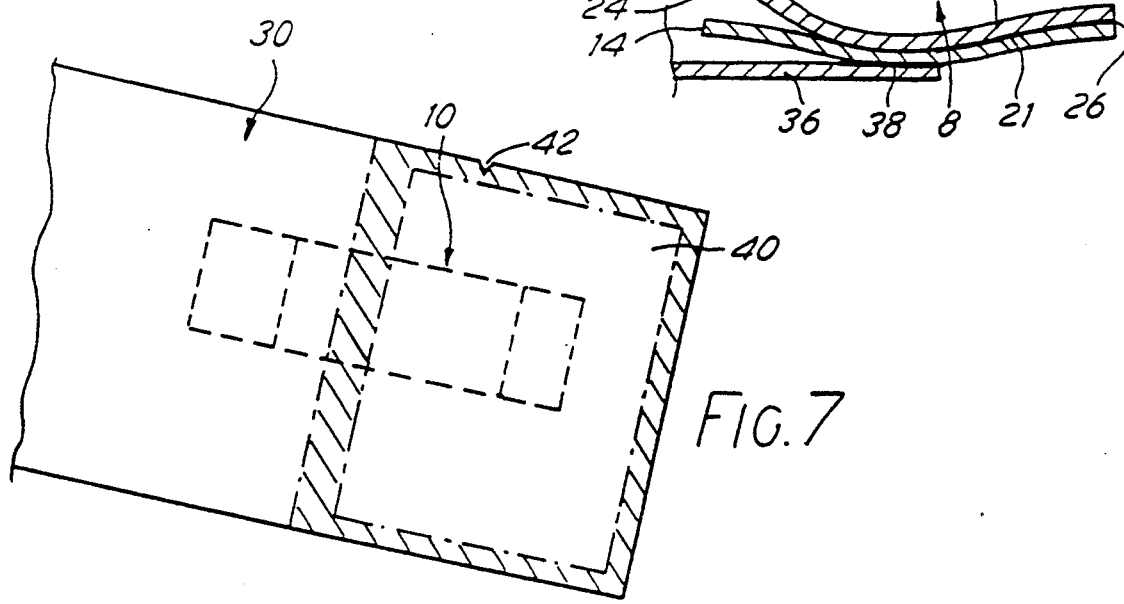
FIG. 7 shows a plan view of an alternative embodiment of a flexible container incorporating the port.

FIG. 7 shows an alternative embodiment of the flexible container incorporating the port, wherein a removable, sealed extension 40 of container body encloses the outer end of the port 10 and protects it from being contaminated after sterilization. For subsequent use, the outer end of the port 10 is exposed by tearing away part of the exterior, which may be provided with a nick 42 to facilitate this.

Heat may be used to make all seals formed in the construction of the port and/or the container, but high frequency sealing could be used instead.

A plurality of ports may be incorporated into a container of the present invention.

It is also possible to incorporate a plurality of channels within a port, by including multiple pairs of inner layers between the outer layers and locating a layer of non-sealable material in each channel during sealing.

I claim:

1. A container comprising a body made from superimposed layers of flexible plastics film material and a port sealed between said layers, wherein the port comprises a pair of outer layers and a pair of inner layers, said inner layers being sealed together along opposite sides so as to define a channel, and united together at one end to provide a pierceable closure which closes off said channel at one end; said inner layers being united at their other ends to respective outer layers; the port being sealed between layers of the container body by a seal transversely of the port in a region occupied by the channel, the outer layers of the port being sealed thereby to adjacent layers of the container body and to adjacent inner layers of the port without the inner layers being sealed to each other by said transverse seal.

2. A container according to claim 1 wherein the two inner layers of the port are formed from a single web of material which has been folded back on itself so that the layers are united at said one end by a fold in the material.

3. A container according to claim 1 wherein the inner and outer layers are formed from a single web of material folded in M-configuration.

4. A container according to claim 1, wherein the union of one of the inner layers and its respective outer layer is offset in the longitudinal direction of said channel with respect to the union of the other inner layer and its respective outer layer, so as to form a lip at the entrance of the channel.

5. A container according to claim 1 wherein the region of the port between the seal (38) of the outer layers with the container body and the union of the ends of outer layers with the respective inner layers comprises a continuous seal between the outer layers and the respective inner layers so as to form reinforced walls for the port.

6. A container according to claim 1 wherein a sealed extension of the container body extends forwardly of the transverse seal and encloses the outer end of the port; at least a portion of the extension being removable to afford access to the port.

7. A method of making a container comprising a body made of superimposed body layers of flexible plastics film and a port sealed between said body layers; said port comprising a pair of outer port layers and a pair of inner port layers; said method comprising the steps of:
    (i) forming the two inner layers of the port from a single web of flexible plastics material by folding it back on itself so that the layers are united at their first ends by a fold in the material;
    (ii) superimposing two further layers of flexible plastics film and said two inner layers to provide a pair of outer port layers and a pair of inner port layers;
    (iii) providing a connection between the other ends of the inner port layers and the respective ends of the outer port layers;
    (iv) sealing said layers along opposite sides so as to form a central channel defined between said inner port layers; said central channel being closed by a pierceable closure provided by said fold at the first ends of said inner layers;
    (v) locating a layer of non sealable material in said channel;
    (vi) locating the four port layers and the layer of non-sealable material between the superimposed body layers; sealing the port between said body layers, said layer of non-sealable material serving to prevent the opposing surfaces of the channel from being sealed together; and
    (vii) subsequently removing said non-sealable layer.

8. A method according to claim 7 including a step of preforming said port comprising said two pairs of port layers sealed to form a central channel prior to said step of sealing said port between the body layers.

9. A method according to claim 7 or 8 including a step of sealing the inner layers of the port to the outer layers so as to provide reinforced walls for the port.

10. A method according to claim 7 including a step of forming the inner and outer layers from a single web of material by folding it in M-configuration.

11. A method according to claim 7 including a preliminary step of providing a laterally elongate array of four superimposed layers of flexible plastics film material, forming a multiplicity of laterally spaced longitudinally extending seals to define a plurality of port portions; and separating the array into individual ports.

* * * * *